US009494188B2

(12) United States Patent
Shellef

(10) Patent No.: US 9,494,188 B2
(45) Date of Patent: Nov. 15, 2016

(54) COMPLIANT FLUID-FILM RIDING TAPER BEARING

(71) Applicant: ETTEM ENGINEERING S.A. LTD., Acco (IL)

(72) Inventor: Rammy A. Shellef, Acco (IL)

(73) Assignee: ETTEM ENGINEERING S.A. LTD., Acco (IL)

(*) Notice: Subject to any disclaimer, the term of this patent is extended or adjusted under 35 U.S.C. 154(b) by 45 days.

(21) Appl. No.: 14/666,224

(22) Filed: Mar. 23, 2015

(65) Prior Publication Data

US 2015/0233416 A1    Aug. 20, 2015

Related U.S. Application Data

(63) Continuation of application No. PCT/IL2012/000345, filed on Sep. 23, 2012.

(51) Int. Cl.
| F16C 32/06 | (2006.01) |
| F16C 17/10 | (2006.01) |
| F16C 41/00 | (2006.01) |
| F16C 43/02 | (2006.01) |

(52) U.S. Cl.
CPC .......... F16C 17/105 (2013.01); F16C 41/004 (2013.01); F16C 43/02 (2013.01); *Y10T 29/49639* (2015.01)

(58) Field of Classification Search
CPC ............ F16C 17/105; F16C 23/02; F16C 23/04; F16C 25/02; F16C 25/05; F16C 27/02
USPC ................. 384/104, 105, 110, 202
See application file for complete search history.

(56) References Cited

U.S. PATENT DOCUMENTS

| 2,322,004 | A |   | 6/1943  | Fast |
| 2,694,781 | A |   | 11/1954 | Hinz |
| 3,174,809 | A | * | 3/1965  | Mackie ................. F16C 32/067 384/104 |
| 3,265,452 | A |   | 8/1966  | Pan et al. |
| 3,439,962 | A |   | 4/1969  | Gothberg |

(Continued)

FOREIGN PATENT DOCUMENTS

| GB | 1174628 A  |   | 12/1969 |
| GB | 1401657 A  | * | 7/1975 ............ F16C 17/024 |

(Continued)

OTHER PUBLICATIONS

International Search Report (ISR) and Written Opinion (WO) dated Jan. 28, 2013 issued in International Application No. PCT/IL2012/000345.

(Continued)

*Primary Examiner* — Phillip A Johnson
(74) *Attorney, Agent, or Firm* — Holtz, Holtz & Volek PC

(57) ABSTRACT

A compliant fluid-film riding taper bearing is configured to include a rotor and a stator for supporting a rotating shaft. The rotor is configured as a rotating monotonously tapering body of revolution having an axis of symmetry and an external tapering surface. The stator has a longitudinal axis and an internal surface disposed in coaxial and conformal alignment with the external tapering surface. The stator is preloaded against the external tapering surface, and is pliantly supported to respond to a distribution of biasing forces and to permit matching elastic and resilient adaptation thereof conformal to deformation of the tapering rotor.

22 Claims, 11 Drawing Sheets

(56) References Cited

U.S. PATENT DOCUMENTS

| | | | | |
|---|---|---|---|---|
| 3,476,451 | A | * | 11/1969 | Schwartzman ..... F16C 32/0622 384/110 |
| 3,674,355 | A | * | 7/1972 | Yearout ................... F16C 27/02 384/110 |
| 3,806,209 | A | | 4/1974 | Laing et al. |
| 4,732,530 | A | | 3/1988 | Ueda et al. |
| 4,828,403 | A | * | 5/1989 | Schwartzman ......... F16C 17/10 384/100 |
| 4,838,710 | A | | 6/1989 | Ohta et al. |
| 4,919,547 | A | | 4/1990 | Schwartzman |

FOREIGN PATENT DOCUMENTS

| | | |
|---|---|---|
| GB | 2084697 A | 4/1982 |
| WO | 9005247 A1 | 5/1990 |

OTHER PUBLICATIONS

Presentation by Ettem Engineering S.A. Ltd., 14 Pages, Oct. 28, 2004.

\* cited by examiner

COMPLIANT FLUID-FILM RIDING TAPER BEARING

CROSS REFERENCE TO RELATED APPLICATION

This application claims priority under 35 U.S.C. §120 of International Patent Application No. PCT/IL2012/000345 filed 23 Sep. 2012, the entire disclosure of which is incorporated by reference herein.

TECHNICAL FIELD

A fluid dynamic bearing having a stationary stator that supports a rotor for rotation and in particular, a self-adaptive film-riding taper bearing where the stator complies with deformation of the rotor.

BACKGROUND

In general, fluid dynamic bearings as well as taper fluid bearings that are axially, radially, and angularly adaptive, are well known per se. For example, U.S. Pat. No. 4,919,547 to Schwartzman, referred to hereinbelow as Schwartzman, recites a dynamically self-adjusted fluid bearing assembly. Schwartzman teaches a fluid bearing assembly including a cone mounted for rotation in association with a shell.

Even though some adjustment is taken care of by Schwartzman, the presently claimed invention provides a monotonous taper bearing with a stator that complies with deformation of the rotor.

SUMMARY

The present invention relates to a self-adaptive fluid dynamic bearing where the toroidal stator complies by elastic and resilient toroidal torsion or twist to dimensional deformation of the rotor. The self-adaptive fluid dynamic bearing is a monotonous taper fluid bearing combining rigid-body adaptivity with non-rigid body compliance.

It is an object of the present invention to provide a compliant fluid-film riding taper bearing assembly including a rotor and a stator. The rotor is a rotating monotonous tapering rotor body of revolution, thus having an axis of revolution, and an external surface. The stator is a stationary toroidal body and has a longitudinal axis and an internal surface configured for coaxial and conformal disposition relative to the rotating external surface. Shallow grooves are disposed on a surface adjacent a fluid-filled interspace. The shallow grooves are configured to create biasing fluid forces in the interspace, which separates the external surface from the internal surface. The taper bearing is characterized in that the stator is pliantly supported by a pliant cushion to respond to a distribution of biasing forces and to permit elastic and resilient matching adaptation thereof conformal to deformation of the tapering rotor.

The stator is configured to conform to deformation of the monotonously tapering rotor in response to forces including centrifugal forces and/or thermal effects.

It is an object of the present invention to provide a stator that is configured to conform by elastic and resilient adaptation in response to biasing forces selected from a group including radially increasing forces and radially decreasing forces.

It is still another object of the present invention to provide shallow grooves that are disposed on the rotating external surface and/or on the stationary internal surface. The shallow grooves have a pattern formation including accommodation for unidirectional rotation and accommodation for bidirectional rotation of the tapering rotor.

It is furthermore an object of the present invention to provide a stationary toroidal stator that is configured for elastic, torsional toroidal deformation by twist of the cross section thereof, to conform to the rotor, to self-correct mismatch between the taper of the external surface of the rotor and the internal surface of the stator.

It is moreover an object of the present invention to provide the stator that is configured for elastic and resilient torsional toroidal deformation in response to deformation of the external surface. The stator may be assembled out of a plurality of stacked elements selected to include at least one flat disk or at least one shell element. Furthermore, the stator may be assembled out of a plurality of abutting sectors or arch-bound sectors. Moreover, the stator may be configured as an elastic and resilient body, which is more elastic than the rotor, thus less rigid relative to the rigidity of the rotor, which if desired, may have the shape of a frustum of a cone.

It is one more object of the present invention to provide a method permitting a fluid-film riding taper bearing to comply with biasing forces created therein by providing a rotating monotonously tapering rotor having an axis of revolution and an external surface. There is further provided a stationary toroidal stator having a longitudinal axis and an internal surface configured for coaxial and conformal disposition relative to the rotating external surface. The stator is a non-rigid body. In addition, shallow grooves are disposed on a surface adjacent to the fluid-filled interspace for creating biasing fluid forces separating the external surface from the internal surface. The method is characterized by pliantly supporting the stator for responding to a distribution of biasing forces and for permitting elastic and resilient matching adaptation thereof to deformation of the tapering rotor.

BRIEF DESCRIPTION OF THE FIGURES

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements, or parts that appear in more than one figure are preferably labeled with a same or similar number in all the figures in which they appear, in which.

DETAILED DESCRIPTION

Figure 1:
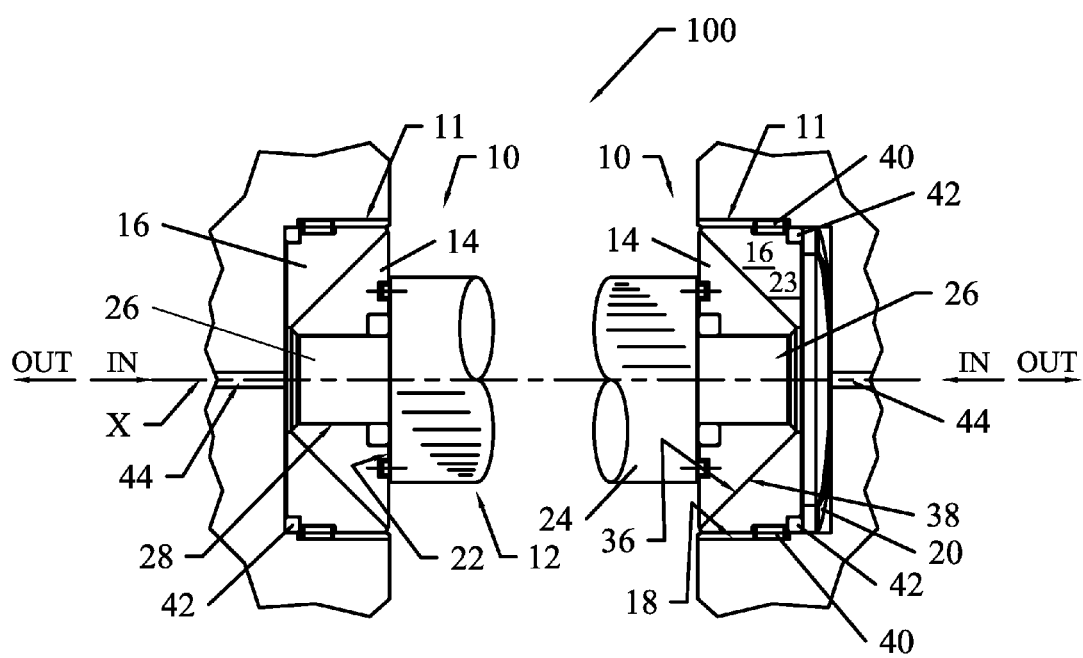
FIG. 1 shows a pair of taper fluid-film riding bearings, each having a rotor and a stator that are mounted on a common shaft.

FIG. 1 illustrates an exemplary embodiment where two fluid-film riding taper bearings 10 supported in a housing 11, are disposed opposite to each other on a common shaft 12, for example a shaft of some typical rotary assembly equipment 100, such as a turbine rotary engine. The shaft 12 is adapted to rotate about a concentric longitudinal axis of symmetry X. Each one of the taper bearings 10 has a monotonously tapering rotor 14 fixedly coupled to the shaft 12. Each rotor 14 has an axis of symmetry about which it is supported for rotation in a coaxially disposed stator 16 pertaining to that same taper bearing 10. The stator 16 has an axis of symmetry and is pliantly mounted in the housing 11. The axis X of the shaft 12 is coaxially aligned with the axes of symmetry of the rotor 14 and of the stator 16.

The monotonously tapering rotor 14, or rotor 14 for short, is configured as a frustum of a tapering body of revolution, thus an axisymmetric body of circular cross-section having a straight axis of revolution X and an external surface 36. Tapering is understood as a gradual monotonous decrease from a larger 20 diameter to a smaller diameter, which is smaller relative to the larger diameter. For example, the rotor may be configured as a right conical frustum. The rotor 14 may be pierced by a coaxial hollow through-bore, for example such as a cylindrical through-bore 28 for receiving the shaft 12 therein. However, the rotor 14 may also be configured as an integral portion of the shaft 12.

The stationary stator 16 may be configured as a female body having an axis and an internal surface 38 configured for coaxial and conformal disposition relative to the external surface 36 of the rotor 14. The stator 16, which is an elastic and resilient body, is configured to conform with and receive therein the tapering rotor 14. The stator may be appropriately configured for support in the housing 11. Furthermore, the stator 16 may be hollow and have an opening allowing the shaft 12 to exit therethrough.

It is noted that to keep the description and the drawings simple, any frustum-like tapering shape of the rotor 14 may be referred to as a conical frustum with a conical external surface, and is represented as such in the Figs. even though the shape of the rotor 14 may differ from that of a straight cone frustum.

Figure 2:
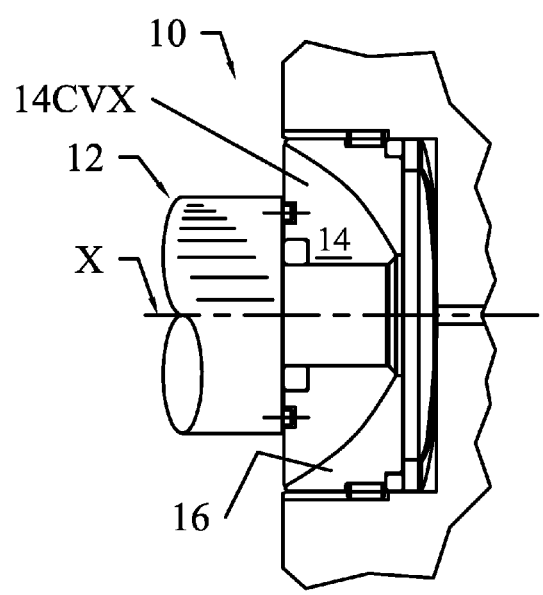
FIGS. 2 and 3 depict possible embodiments of the rotor shown in FIG. 1.
Figure 3:
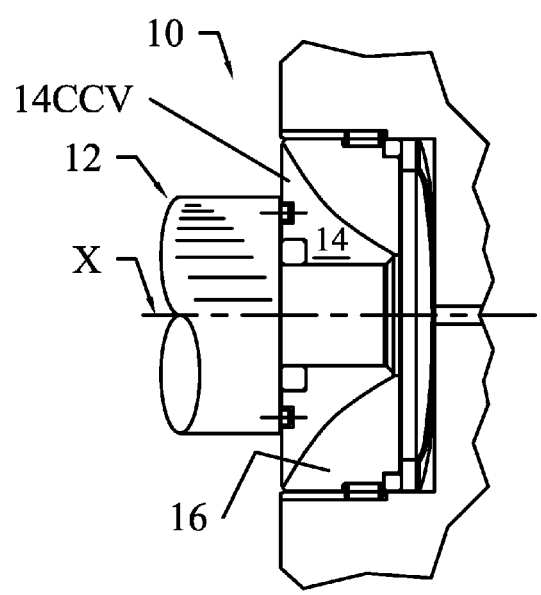

As shown in FIGS. 2 and 3, a tapering body of revolution may be convex like the convex rotor 14CVX in FIG. 2, or concave like the concave rotor 14CCV in FIG. 3, that both taper from end to end. The directrix of the tapering body of revolution is preferably a monotonous curve. When the directrix is a straight segment, the tapering body of revolution becomes a conical frustum.

In FIG. 1, the two taper bearings 10 are axially preloaded towards each other by at least one elastic element 20, such as for example a mechanical wave spring 20 that may optionally be selected as any other appropriate spring, spring element, or spring device. The at least one elastic element 20, may be appropriately disposed in the housing 11, with axial displacement of the stator 16 being allowed by an anti-rotation device 40, such as a dowel for example, appropriately disposed in a recess 18 opened parallel to the axis X. The at least one elastic spring 20, or spring element 20 applies axial preloading forces acting to urge the pair of stators 16 towards each other to positively confine therebetween the rotating assembly, i.e. the rotors 14 and at least a portion of the shaft 12. Although not shown in the Figs., the shaft 12 is not necessarily confined between the taper bearings 10, but a portion of the shaft 12 may protrude through, out of, and away beyond the stator 16. Furthermore, the shaft 12 may be supported by more than two taper bearings 10, even though not being depicted as such in the Figs.

The preloading forces applied by the stator 16 are preferably selected 25 to be larger and exceed the maximal possible external loads that may be applied upon the shaft 12. Such preloading forces are inherently transformed into radially directed restoring forces occurring in the taper bearings 10 to act positively so as to center the rotary assembly of the rotors 14 within the stators 16 while in operational use. Thereby, the rotating shaft 12 remains stably supported over the entire range of operational conditions for which the taper bearings 10 are designed to work. The at least one elastic spring 20, which applies axial preloading forces, may allow a relatively large tolerance stack-up in a variation of axial dispositions of the rotor 14, to comply with thermal deformations or other physical effects taken alone and in concurrent combination.

It is noted that directional terms appearing throughout the specification and claims, e.g. "out", "in" etc., and derivatives thereof, are defined in relation with and along the axis X, with IN pointing "inward", and opposite thereto, OUT pointing in the "outward" direction, axially out and away from the area where the shaft 12 is disposed in support between the taper bearings 10, as shown in FIG. 1. These directional terms are used for illustrative purposes only, and are not intended to limit the scope of the appended claims. In addition it is noted that each portion or part of the various embodiments of the bearings 10, even when displayed alone, may be described in relation to the axis X and to the IN and OUT directions indicated in FIG. 1.

Figure 7:
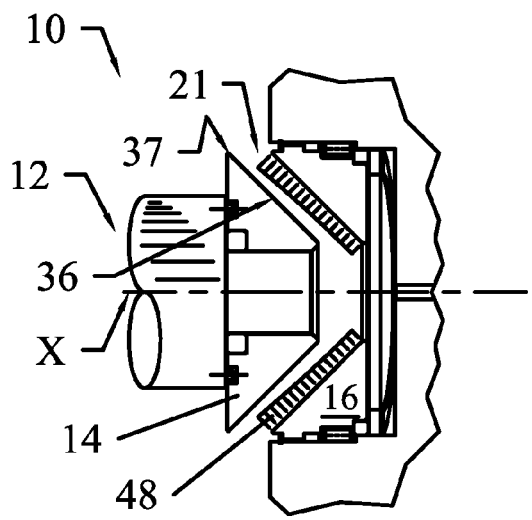
FIG. 7 shows a predominantly even or equal distribution of pressure forces generated in fluid-film riding taper bearings.

In their various embodiments, the fluid-film riding taper bearings 10 include a thin layer of fluid, be the fluid either a liquid or a gas such as air, available from the surroundings and disposed at the interface of the rotor 14 and the stator 16 to separate therebetween by an interspace 21, better seen in FIG. 7. The tapering rotor 14 is adapted to ride on the thin layer of fluid when supported for rotation by the stator 16.

For the sake of keeping the description simple, items well known to those skilled in the art, such as the source of the fluid and the passages of the fluid through the taper bearing 10 are not described and are not shown in the Figures. Likewise, materials of construction are not described in detail for the same reasons.

The shaft 12 may be configured to have two or more outwardly facing shoulders 22 and an intermediate cylindrically shaped shaft central portion 24 that extends therebetween. Furthermore, the shaft 12 may have two cylindrical outer lateral portions 26, smaller in external diameter than the external diameter of the shaft central portion 24, where each lateral portions 26 projects axially and outwardly away from a respective one of the shoulders 22. Moreover, each rotor 14 may be hollow and may have a cylindrical axial through-going bore 28, which is adapted to receive therein an associated lateral portion 26 of the shaft 12.

Figure 4:
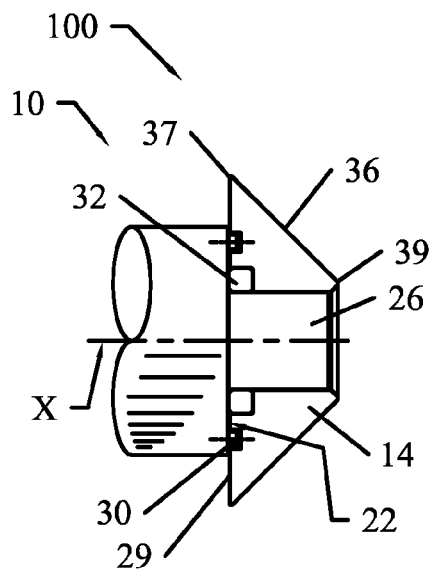
FIG. 4 illustrates possible means for coupling the rotor to the shaft.

FIG. 4 shows drive members 30, or pins 30 that may be disposed to project out of the outwardly facing shoulders 22 of the shaft 12, to penetrate into inner faces 29 of the rotors 14 so that the rotors 14 may be driven to rotate together with the shaft 12. To prevent deformation of the rotor 14 by direct coupling with the shaft 12, a peripheral pliant cushion 32 may support each rotor 14 of the taper bearing 10 for secure mounting thereof on the shaft 12. The cushion 32 surrounds the lateral portion 26 of the shaft 12 in abutment with the shoulder 22, to be received in an annular slot appropriately formed in an interior side of the rotor 14. The cross-section of the cushion 32 may be selected as desired to suit assembly and operational requirements.

In FIG. 4, the rotor 14 is configured as a tapering body of revolution, shown as a right conical frustum having an axis of revolution coaxial with the axis X, and an external surface 36, shown as an external conical surface 36. The external conical surface 36 tapers axially and away from a first circular rim 37 to a second circular rim 39. The first circular rim 37 has an external diameter that is larger than the smaller external diameter of the second circular rim 39.

The stator 16 in FIG. 4 is shown to be configured as a shell-like hollow body having a funnel-shaped entrance opening which is the internal shell surface 38, thus as a conical surface 38, having an axis coaxial with the axis X of the rotor 14. The stator 16 is configured to conform to, to receive therein, and to match the shape of the external conical surface 36 of the rotor 14. Reciprocally, the rotating external conical surface 36 is coaxial with and matches the shape of the stationary internal surface 38, which is pre-loaded against the external conical surface 36. It is in the interspace 21 that is disposed between the axially aligned external and internal surfaces, shown as conical surfaces, respectively 36 and 38, that the thin layer of fluid is formed by rotation of the rotor 14 relative to the stator 16. The toroidal stator 16 is thus configured for elastic torsional and toroidal deformation to conform to the rotor 14 by twist of the cross-section, where the stator deforms to self-correct any mismatch between the external surface 36 and the interior surface 38 which are disposed in mutual relative sliding.

The stator 16 is inherently stationary and may be mounted in and coupled to the housing 11 of some typical rotary assembly equipment 100 for example by anti-rotation devices 40, shown in FIG. 1. The anti-rotation members 40 may be disposed in respectively associated adjacent cavities that may be formed in both the stator 16 and the housing 11, such as in the recess 18. Furthermore, the stator 16 may be supported in the housing 11 by at least one pliant support element 42 that may be configured as a concentric peripheral pad 42 or cushion 42. The peripheral pad 42 may be received in an annular recess, which may be formed in an exterior surface of the stator 16. Hence, the stator 16, which is an elastic and resilient body, may be considered as a non-rigid idealized solid body disposed on a pliant peripheral support pad 42. This means also that the stator 16 may be configured as an elastic and resilient body, which is more elastic than the rotor 14. This means that the stator 16 is a non-rigid idealized solid body disposed on a flexible support.

In use, the taper bearings 10 support the rotating shaft 12. The at least one spring element 20, shown on the right hand side of FIG. 1 may apply axial pre-loading forces onto the taper bearings 10. These axial pre-loading forces are transferred to the stator 16 of that same taper bearing 10, for example via the peripheral pad 42 that is associated therewith. From the internal surface 38 of the stator 16 of the right hand side taper bearing 10 in FIG. 1, these pre-loading forces are transmitted, via the fluid disposed in the interspace 21, to the external surface 36 of the rotor 14 and from there to the shoulder 22 of the shaft 12. These pre-loading forces are then transmitted from the shaft 12 to the taper bearing 10 shown on the left hand side of FIG. 1, in a similar but opposite way, via the left shoulder 22 of the shaft 12. From the shaft 12, the pre-loading forces pass to the rotor 14 and via the fluid disposed in the interspace 21 in the left hand side taper bearing 10, to the stator 16 and to the stator's related peripheral support pad 42. In turn, the pre-loading forces are applied say via the pad 42 that is associated with the left hand side of the taper bearing 10 in FIG. 1, to the housing 11.

Optional vents 44, shown in FIG. 1, may be formed and disposed in the housing 11 to prevent a build up of pressure of fluid trapped in the taper bearings 10. These optional vents 44, such as shown as an axial bore 44, may be formed in the housing 11 to lead fluid out thereof for example. The vents 44 may allow circulation of fluid, for example for heat exchange purposes related to the operation of the taper bearings 10.

Figure 5A:
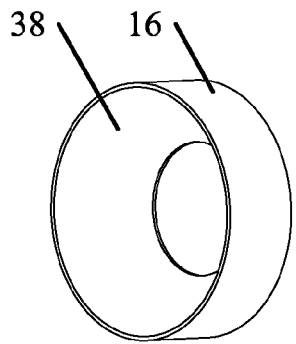
FIGS. 5A, 5B, and 5C depict embodiments of the stator.
Figure 5B:
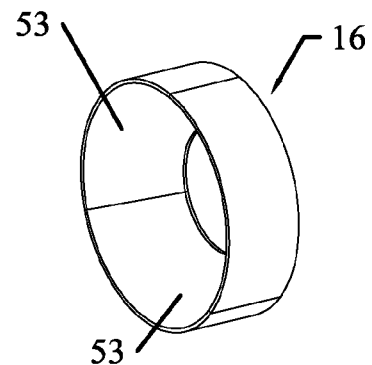
Figure 5C:
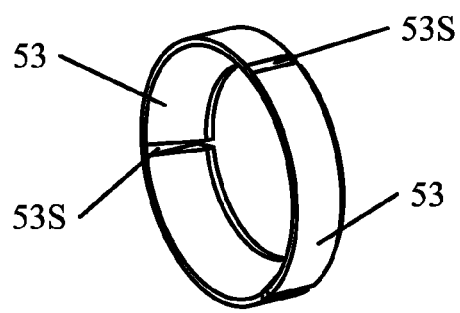

FIGS. 5A, 5B, and 5C show exemplary embodiments of the structure of the stator 16. In one embodiment, the stator 16 may be built as a single unitary integral piece of material, as depicted in FIG. 5A. In another embodiment, the stator 16 may have a construction that is formed and assembled out of separate peripherally abutting sectors 53, preferably but not necessarily of equal angular span disposed in distribution about the axis X, as shown in FIG. 5B. In one more embodiment depicted in FIG. 5C, the sectors 53 are arch-bound sectors that may be separated by spacing elements 53S, such as for example, spacers, shims, or pins. This means that the sectors 53 may have either an equal or an unequal angular span, and be disposed in either symmetric or asymmetric distribution about the axis X.

Figure 6A:
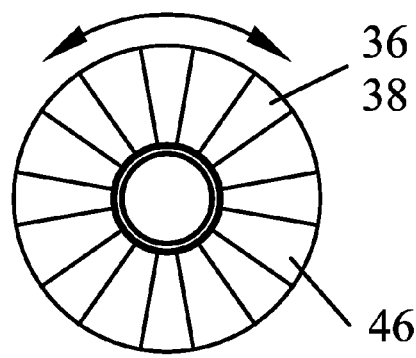
FIG. 6A to 6C illustrate possible shallow groove formations configured to generate fluid pressure.
Figure 6B:
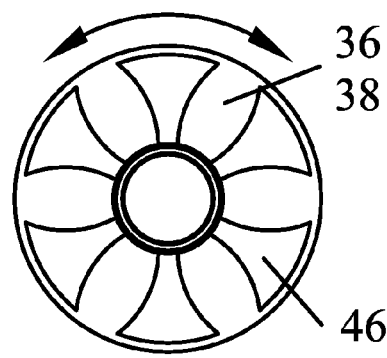
Figure 6C:
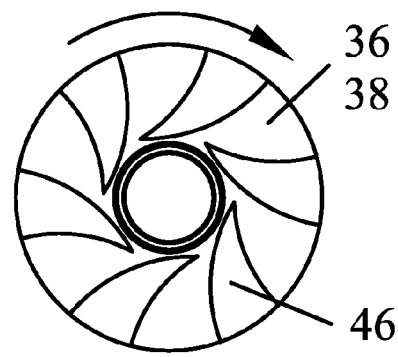

FIGS. 6A to 6C illustrate shallow grooves with pattern formations 46 operative in association with the rotating male body of the tapering rotor 14 and of the stationary female body of the stator 16. The groove formations 46 may be disposed on the external surface 36, or on the internal surface 38, or on both the external and the internal surfaces, respectively 36 and 38. Evidently, the external surface 36 and the internal, surface 38 may be conical surfaces, but this is not necessarily so. With fluid present in the shallow grooves 46 and in the entire interspace 21, and when the rotor 14 is rotatably driven, the grooves 46 are configured to create fluid pressure that apply distributed biasing forces onto the external and internal surfaces, respectively 36 and 38. It is the application of the distributed biasing forces that creates the fluid filled interspace 21, which separates the external surface 36 away from the internal surface 38.

A typical depth of the shallow grooves 46, suitable for example for use with a gas, may vary between 1 to 5 microns, and the shallow grooves 46 suitable for use with a liquid may typically vary for example between 10 to 50 microns, where a micron is equal to one thousandth of a millimeter. The shallow grooves 46 shown in FIGS. 6A and 6B have an axi-symmetric pattern formation which is indifferent to the direction of rotation of the rotor 14, and are thereby configured for bidirectional direction of rotation about the axis X, as indicated by the double-headed arrows in these Figures. In contrast thereto, the shallow grooves 46 shown in FIG. 6C have a directional pattern formation accommodating rotation of the rotor 14 in a preferred direction, and are therefore configured for a unidirectional direction of rotation about the axis X, as indicated by the single-headed arrow in FIG. 6C. It is noted that the shallow grooves 46 depicted in FIG. 6C are suitable for a clockwise direction of rotation of the rotor 14. Evidently, the unidirectional pattern formation of the shallow grooves 46 may be selected as desired to permit rotation in either clockwise or counterclockwise direction. In other words, the shallow grooves 46 may have a pattern formation selected to accommodate unidirectional rotation or bidirectional rotation. If desired, the shallow grooves 46 may be disposed on one of or on both of the rotating external surface 38 and the stationary internal surface 36.

FIG. 7 presents a predominantly even or equal distribution of pressure forces operative in the interspace 21 during rotation of the rotor 14 of the fluid-film riding taper bearings 10. Such an equal distribution of forces 48 is shown as an example only to permit comparison with other different distributions of force. As described hereinabove, the stator 16 is elastically supported and disposed to respond to the distribution of biasing forces and to permit elastic and resilient matching adaptation thereof conformal to deformation of the tapering rotor 14.

FIGS. 8, 9, 11 and 12 illustrate various patterns of uneven force distributions that may develop in the interspace 21, which forces twist the cross-section of the stator 16, as shown by the arrow A2, to self-correct the film thickness between the external and internal surfaces, respectively 36 and 38.

Figure 8:
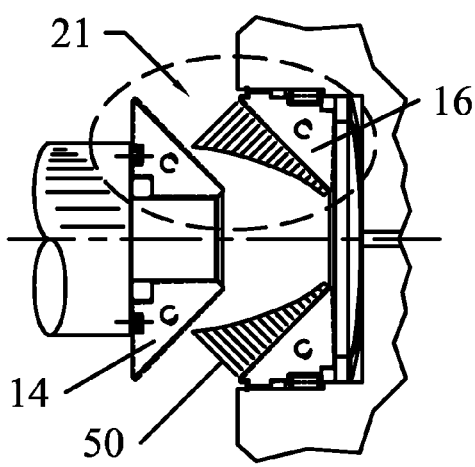
FIGS. 8 to 13 present examples of uneven pressure force distributions and associated rotor-stator deformations of the fluid-film riding taper bearings.
Figure 9:
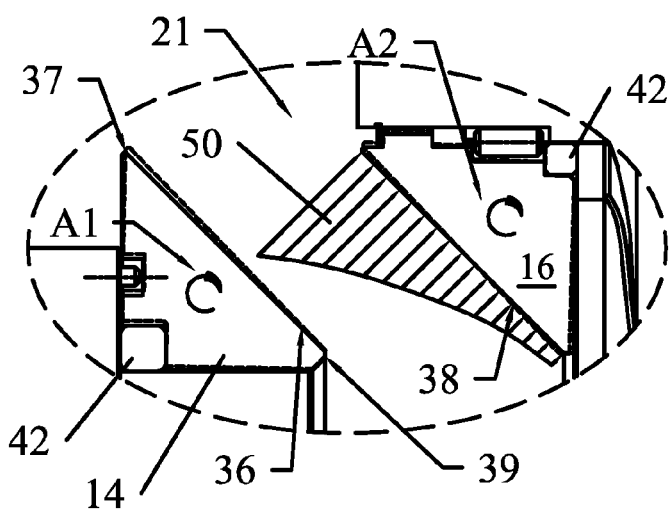

FIG. 9 is a detail of FIG. 8, which depicts a force distribution pattern 50 that may occur in the interspace 21 at high rotational speed of the rotor 14. At locations on the external bearing surface 36 that are farther radially and distally away from the axis X, the centrifugal forces that are generated are larger than the centrifugal forces created at other locations that are radially and proximally closer to the axis X. The increase of the centrifugal forces associated with the radial distance away from the axis X results in a so called "predominant centrifugal effect", which is represented by an exemplary radially outward increasing distribution of forces indicated as 50 in FIGS. 8 and 9.

The centrifugal forces that develop on the high-speed rotating rotor 14 urge an elastic strain deformation thereof, whereby the larger external diameter at the first circular rim 37 incurs an external diameter increase that is larger than a smaller external diameter gain of the second and smaller circular rim 39. The increase of the larger external diameter at the circular rim 37 narrows the gap of the interspace 21 and increases mutual forces on both the external and internal surfaces 36 and 38 respectively, thereby explaining the radially increasing force distribution 50. It is well known that the fluid pressure forces are extremely sensitive to the thickness of the film of fluid in the gap of the interspace 21, i.e. the magnitude of the gap extending between the external bearing surface 36 and the internal surface 38, and that these forces increase considerably as this gap tends to close. The deformation of the rotor 14 is indicated in FIG. 9 by the dashed line adjacent the rotor, showing a clockwise elastic cross-sectional deformation of the external conical surface 36, which is indicated by the arrow A1. The net result of the elastic strain deformation of the rotor 14 is an increase of the angle αR spanning between the axis X and the originally undeformed external surface 36, as shown in FIG. 10.

Figure 10:
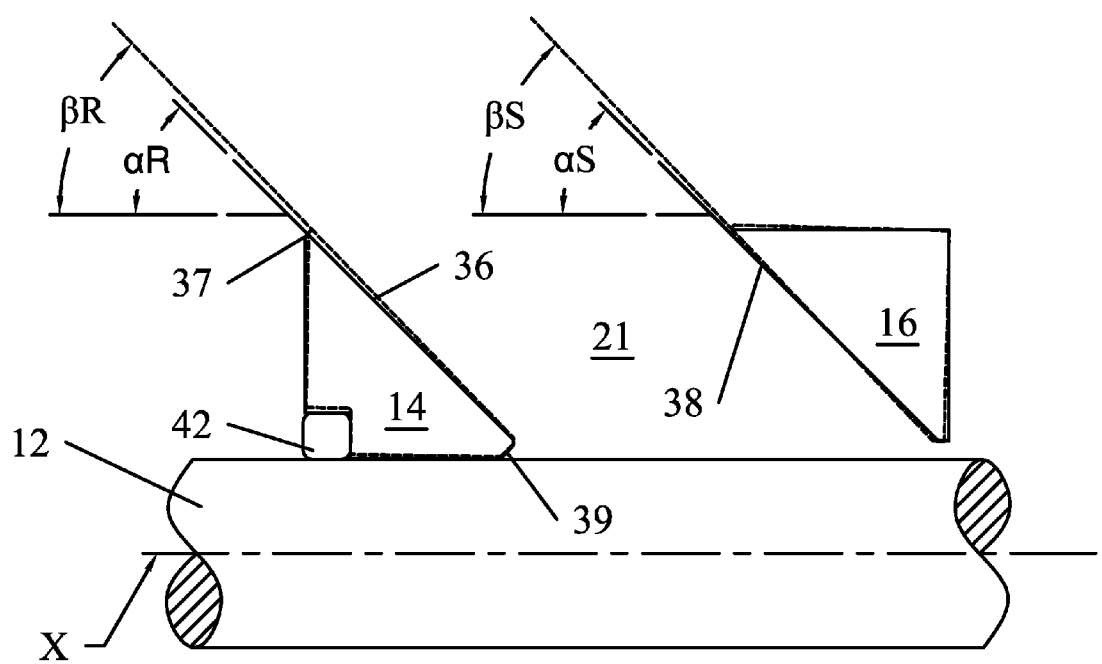

FIG. 10 presents a more detailed but schematic illustration of the predominant centrifugal effect elastic deformation of the rotor 14 and of the conformal and compliant elastic deformation of the hollow stator 16. The deformation of the rotor 14 is shown in exaggeration by the dashed lines adjacent the rotor 14 and by the clockwise elastic twisting of the originally undeformed external surface 36 resulting in an increased angle αR shown as the angle βR, which is greater than the angle αR. Accordingly, such an elastic and resilient deformation of the rotor 14 causes an application of forces onto the internal surface 38, which responds elastically to conform with and comply with the new orientation and disposition of the clockwise elastically twisted external surface 36. The stator 16 is a toroidal body formed by the rotation the cross-section of the stator 16 about the X-axis, and complies by elastic toroidal deformation. The stator 16 thus deforms in elastic torsional twist in the same clockwise direction, as indicated by the arrow marked as A2 in FIG. 9 on the cross-section of the stator 16, taken in a plane that includes the axis X. Such an elastic toroidal deformation may be regarded as a torsional twist, or as a toroidal twist, or a toroidal deformation in torsional twist of the stator 16, which deformation or twist tends to urge the internal surface 38 to become disposed in parallel to the external surface 36. This means that the stator 16 is configured to conform by elastic and resilient adaptation to deformation of the rotor 14 in response to centrifugal forces.

As depicted schematically in FIG. 10, the net result of the elastic strain deformation of the stator 16 compliantly corresponding to the deformation of the rotor 14 is a clockwise increase of the original angle αS spanning between the axis X and the original disposition of the internal surface 38. As shown in FIG. 7, it may thus be said that the deformation and clockwise twisting of the external surface 36 generates an uneven or unequal distribution of forces 50 in the fluid disposed in the interspace 21, which forces are mutually applied perpendicular on the external surface 36 and on the internal surface 38 of the stator 16. In the unevenly distributed set of forces 50, the magnitude of these forces is proportional to their radial distance away from the axis X. Thereby, the stator 16 is urged to twist in elastic torsion so as to comply with the deformation of the rotor 14. This means that the angles βR and βS tend to become equal.

To facilitate compliance of the stator 16 to the rotor 14, at least one appropriately disposed pliant support 42 may assist the elastic deformation for matching adaptation of the stator 16 to the dimensional variation(s), deformation(s), and misalignments of the rotating rotor 14. Compliance of the stator 16 to the external surface 36, configured either as a conical surface or as another tapering surface, refers to the angular adaptation by elastic toroidal torsion thereof, which is shown schematically in FIG. 10, as described hereinabove. The cross-section of the pliant support 42 may be selected as desired, and may be configured as, for example, a peripheral pad 42 about which the stator 16 may easily twist. The peripheral pad 42 may engage a circumferential recess disposed in the stator 16, or may be retained in place by other practical means. However, the pliant support 42 may also be configured as any suitable protrusion or as other means, or as a combination thereof, that are configured to facilitate free twist and torsional displacement, such as one or more out of a plurality of rings, segments, ribs, pins, or balls, that are not shown in the Figs.

Figure 11:
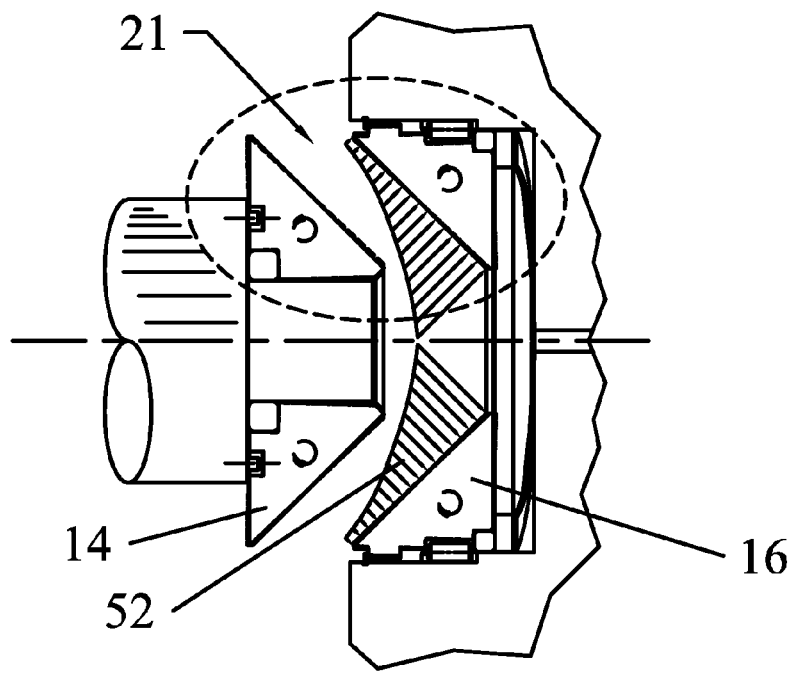
Figure 12:
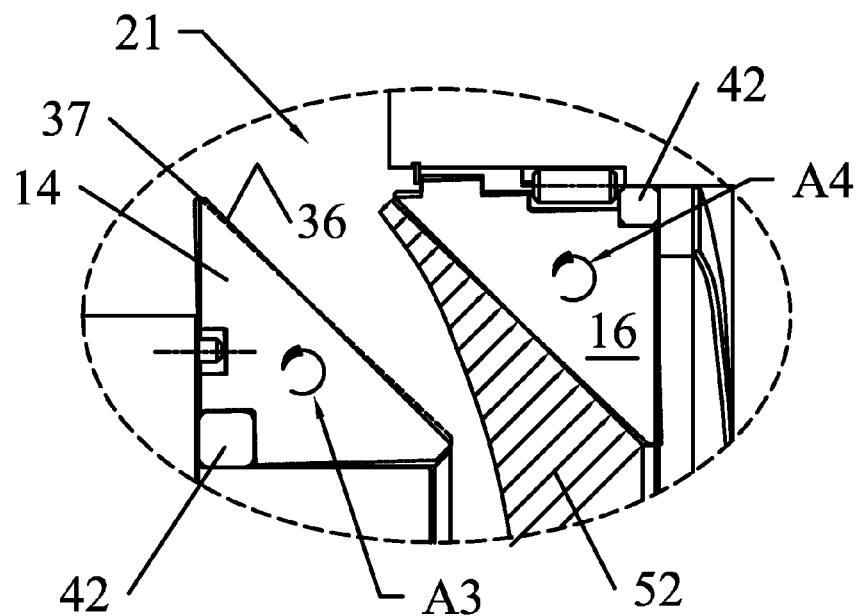

FIG. 12 is a detail of FIG. 11, which depicts a force distribution pattern 52 that may develop in the interspace 21 due to thermal effects encountered when operating under possible low temperature conditions prevailing at the larger external diameter 37 of the rotor 14. At low temperature cooling, including cryogenic cooling, portions of the external surface 36 disposed radially and distally farther away from the axis X may deform by thermal shrinkage and undergo larger dimensional contraction of material relative to the dimensional contraction occurring at portions thereof that are radially and proximally closer to the axis X. The larger contraction widens the gap of the interspace 21 at locations away from the X-axis and reduces mutual forces on both the external and internal surfaces, 36 and 38 respectively. This explains the radially decreasing force distribution 52. The decrease of the thermal contraction effects associated with the radial distance away from the axis X results in a so called "predominant thermal effect", which is represented by an exemplary radially outward decreasing distribution of forces indicated as 52 in FIGS. 11 and 12.

The thermally generated contraction forces that develop on the high-speed rotating rotor 14 urge an elastic deformation thereof, whereby the larger external diameter at the first circular rim 37 incurs an external diameter decrease in dimension that is larger relative to a smaller external diameter gain at the smaller external diameter of the second circular rim 39. The deformation of the rotor 14 is indicated in FIG. 12 by the dashed line adjacent the rotor, showing an anticlockwise elastic twisting of the external surface 36, which is indicated by the arrow A3. The net result of the elastic deformation of the rotor 14 is a decrease of the angle αR spanning between the axis X and the original undeformed external surface 36, as shown in FIG. 13.

Figure 13:
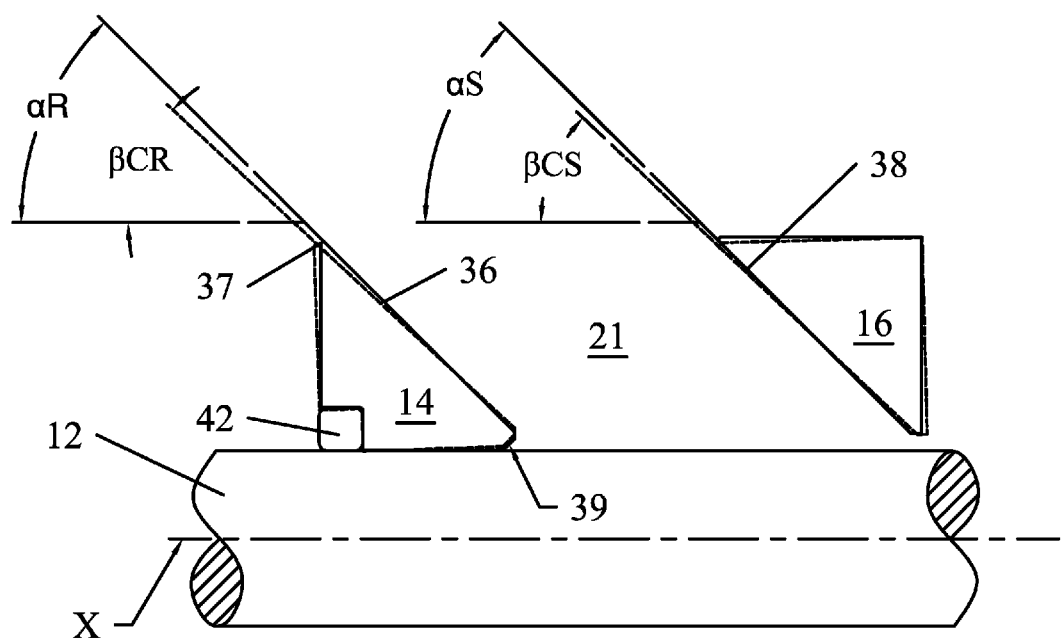

FIG. 13 presents a more detailed but schematic illustration of the predominant thermal effect elastic deformation of the rotor 14 and of the conformant and compliant elastic deformation of the hollow stator 16. The deformation of the rotor 14 is shown in exaggeration by the dashed lines adjacent the rotor 14 and the anticlockwise twisting of the originally undeformed external surface 36 resulting in a reduction of the angle αR, shown as angle βCR, which is evidently smaller than the angle αR. Accordingly, such a deformation of the rotor 14 causes an application of forces onto the internal conical surface 38, which tries to comply and match the shape of the external conical surface 36. The stator 16 complies by elastic twisting in a direction indicated in FIG. 12 by the arrow marked A4 on the cross-section of the stator 16, which cross-section is taken in a plane that includes the axis X. Such an elastic toroidal deformation or twist was described hereinabove in principle, but with reference to an opposite direction, with respect to FIG. 10, as a torsional twist, or a toroidal twist, or a toroidal deformation in torsional twist of the stator 16.

As depicted schematically in FIG. 13, the net result of the elastic strain deformation of the stator 16 compliantly corresponding to the deformation of the rotor 14 is an anticlockwise decrease of the original angle αS spanning between the axis X and the original disposition of the internal surface 38. The angle αS is reduced to the angle βCS. It may thus be said that the deformation of the rotor 14 generates a typical uneven distribution of forces 52 in the fluid disposed in the interspace 21, which forces are mutually applied onto the external surface 36 and the internal surface 38 of the stator 16. Thereby, the stator 16 is urged to twist in elastic torsion so as to comply with the deformation(s) of the rotor 14, so that the angles βCR and βCS tend to become equal. This means that the stator 16 is actually elastically supported and configured to respond to a distribution of biasing forces and to permit elastic and resilient matching adaptation thereof conformal to deformation of the tapering rotor 14. In other words, the stator 16 is configured to conform by elastic and resilient adaptation to deformation of the rotor 14 in response to forces including centrifugal forces and/or thermal effects, as well as radially increasing forces and radially decreasing forces. One may thus say that the stator 16 is configured for elastic and resilient torsional toroidal deformation in response to deformation of the external surface 36 of the rotating rotor 14.

However, to facilitate compliance of the stator 16 to the rotor 14, an appropriately disposed pliant support 42 may assist the motion for matching adaptation to the deformation of the rotating male rotor 14, in the same manner and configuration as described hereinabove with respect to FIG. 10.

Figure 14:
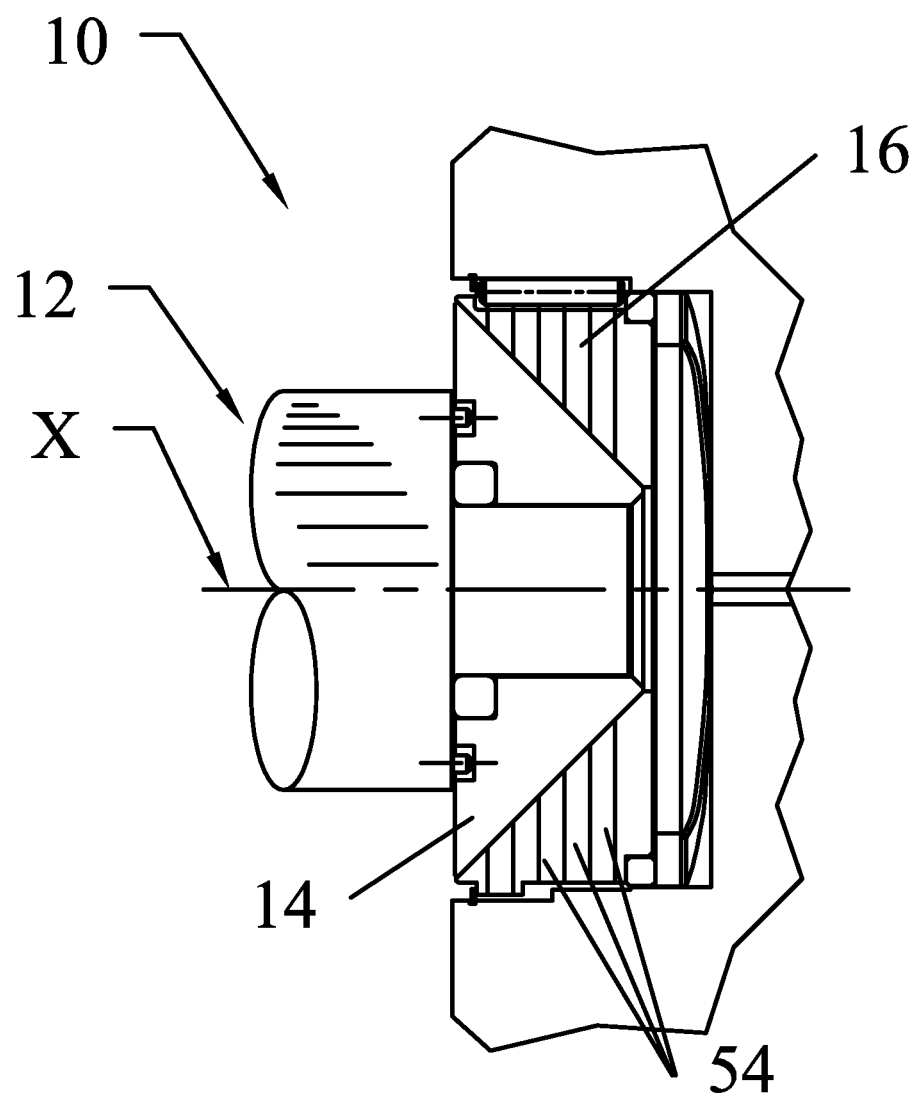
FIGS. 14 to 16 depict possible structural embodiments for providing enhanced elasticity and resiliency to the stator.
Figure 15:
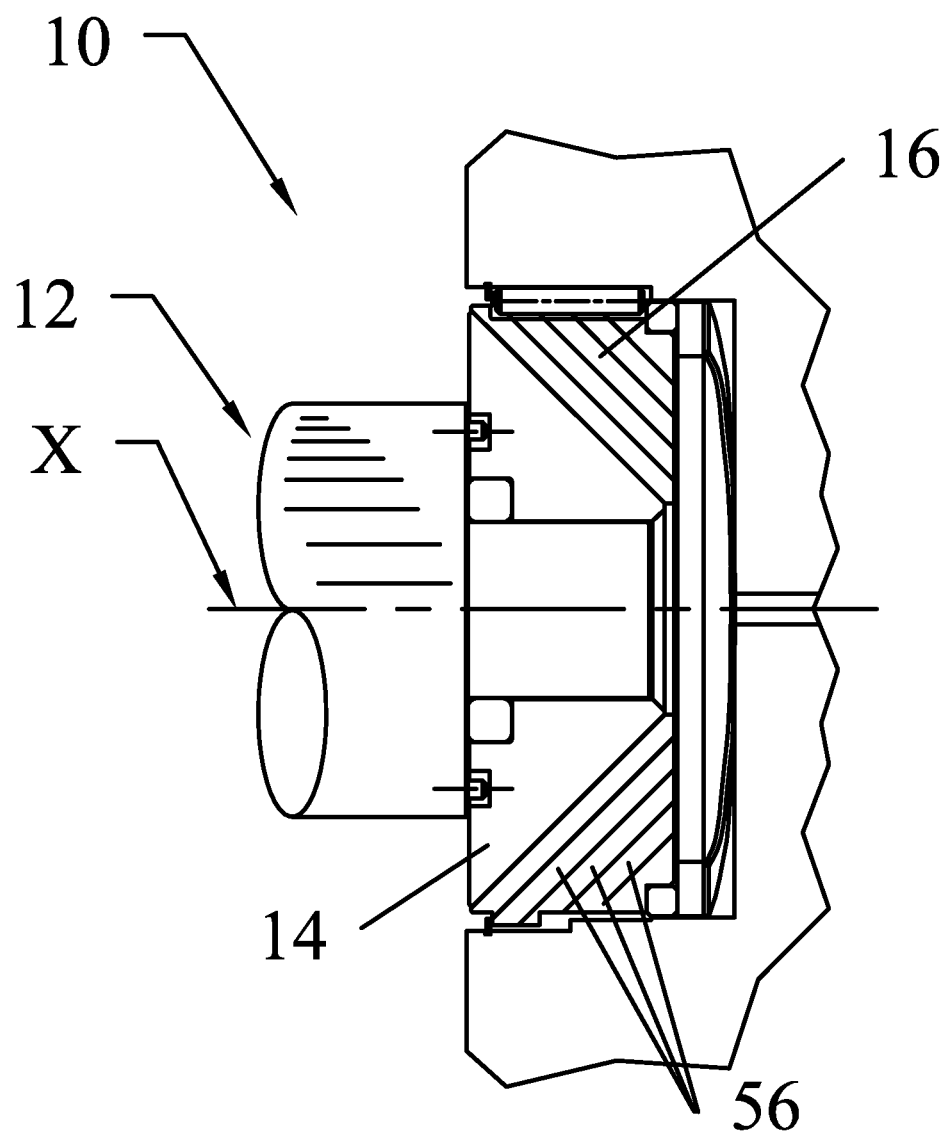
Figure 16:
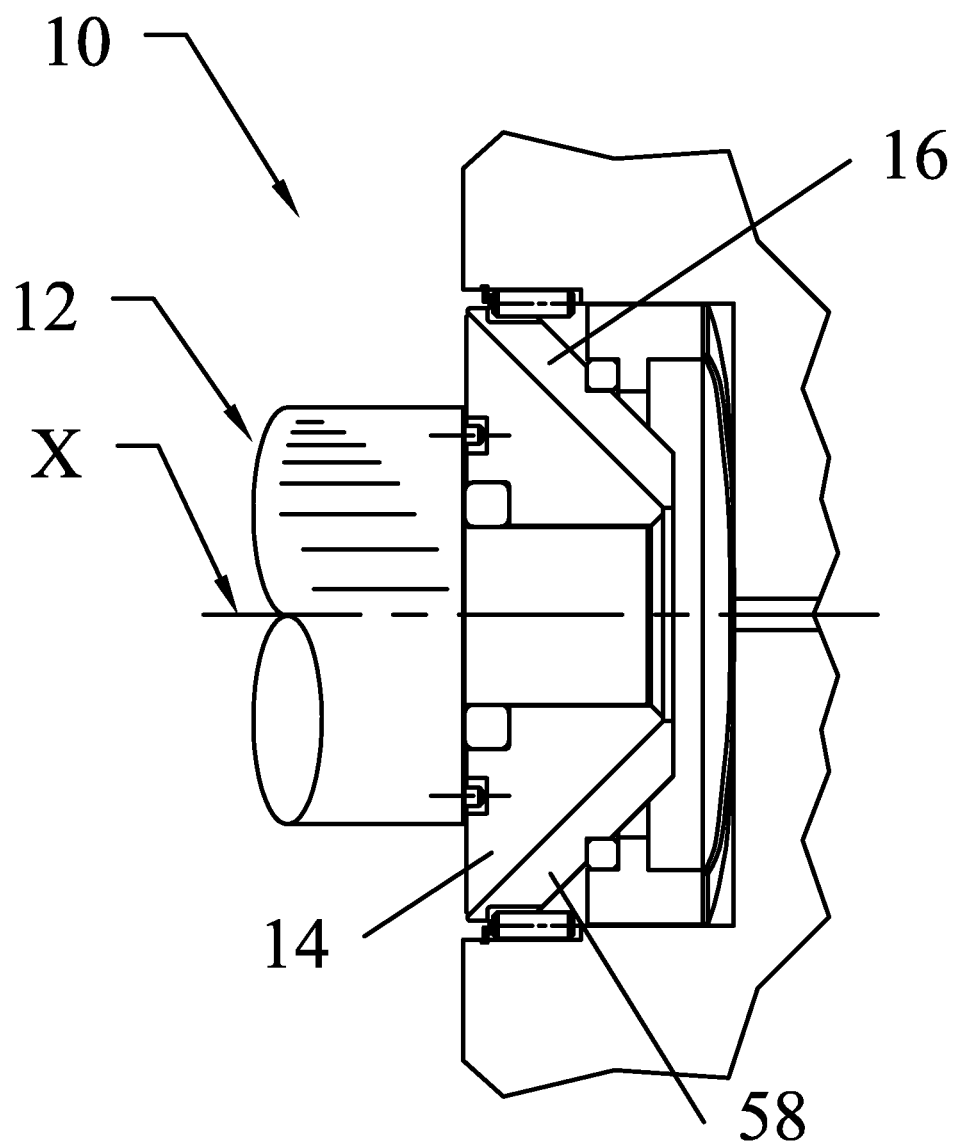

FIGS. 14 to 16 illustrate possible additional structural embodiments for providing enhanced elastic and resilient torsion or twist capability to the cross-section of the stator 16. In an embodiment shown in FIG. 14, the stator 16 may be assembled out of a plurality of stacked flat annular disk-like elements 54 or ring-like slices 54, configured as if cut out of the stator 16 by parallel planes that extend perpendicular to the axis X. In another embodiment, shown in FIG. 15, the stator 16 may be assembled out of a plurality of stacked hollow open-ended shells elements 56, configured as if cut out of the stator 16 by planes parallel to the internal surface 38. In yet another embodiment, shown in FIG. 16, the stator 16 may be configured to have the shape of a single one of the hollow open-ended thin shell elements 56, shown as a single hollow open-ended thin element 58. Common to the various embodiments of the stator 16 described hereinabove is the provision of the internal surface 38 and of the torsional adaptive elastic and conformal matching of the stator 16 to the dimensional and angular deformation(s) of the external surface 36 of the rotor 14. The various embodiments refer alternatively, to a stator 16 realized as a single unitary integral one-piece stator, a stator 16 assembled out of at least two abutting sectors of either equal or unequal angular span that are disposed in symmetric or asymmetric distribution about the axis X, a stator 16 including a stack of annular flat disk-like elements 54, a stack of hollow open-ended shells elements 56, a single hollow open-ended shell element 58, or a combination thereof.

The elastic torsional adaptive conformal matching of the stator 16 to the rotor 14 may be enhanced by one or more different approaches. First comes the suitable selection of the material(s) having an appropriate modulus of elasticity from which the stationary toroidal female body of the stator 16 is made. For the stator 16 for example, which is a non-rigid body, one may consider a non-metallic material such as graphite provided with appropriate abrasion-resistant properties. In opposite thereto, the rotor 14 may be selected to have a modulus of elasticity much more rigid, say by about one order of magnitude or higher, than the modulus of elasticity of the stator 16. This means that the stator 16 is an elastic and resilient body relative to the rotor 14. Second in line is the provision of at least one means to facilitate the elastic torsional twist for adaptive matching of the stator 16 to the rotor 14.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

REFERENCE SIGNS LIST

αR angle between axis X and the undeformed external surface 36 of the rotor 14
αS angle between axis X and the undeformed internal surface 38 of the stator 16
βCR angle αR after cooling deformation
βR angle αR after deformation of the rotor 14
βS angle αS after deformation of the stator 16
βCS angle αS after cooling deformation of the stator 16

A1 arrow showing clockwise elastic pivotal direction of the rotor 14
A2 arrow showing clockwise elastic pivotal direction of the stator 16
A3 arrow showing anticlockwise elastic pivotal direction of the rotor 14
A4 arrow showing anticlockwise elastic pivotal direction of the stator 16
IN inward direction
OUT outward direction
X axis
10 fluid-film riding taper bearings
11 housing 11
12 shaft 12
14 rotor 14
14CCV concave rotor
14CVX convex rotor
16 stator
18 recess
20 spring element
21 interspace
22 outwardly facing shoulder
24 shaft central portion
26 outer lateral portions
28 through-going bore
29 inner faces of the rotor 14
30 drive member or pin
32 peripheral cushion
36 external surface
37 first circular rim
38 internal surface
39 second circular rim
40 anti-rotation device
42 support element or peripheral pad
44 vent or axial bore
46 groove formations
48 equal distribution of forces
50 radially increasing distribution of forces
52 radially decreasing distribution of forces
53 sector
53S spacing elements
54 annular flat disk-like elements or annular slices
56 hollow open-ended shell element
58 single hollow open-ended shell element
100 rotary assembly equipment

The invention claimed is:

1. A compliant fluid-film riding taper bearing comprising:
a rotating monotonous tapering rotor configured for disposition on a shaft and having an axis of revolution and an external surface,
a stationary toroidal stator having a longitudinal axis and an internal surface configured for coaxial and conformal disposition relative to the rotating external surface, and
shallow grooves, disposed on a surface adjacent a fluid-filled interspace, configured to create biasing fluid forces in the interspace which separates the external surface from the internal surface,
wherein the stator is a non-rigid body appropriately supported by at least one pliant support element configured to allow the stator to twist thereabout to respond to a distribution of biasing fluid forces and to permit elastic and resilient matching adaptation thereof conformal to deformation of the rotor, where the taper bearing is configured for the shaft to protrude therethrough and away thereout.

2. The taper bearing of claim 1, wherein:
a concentric peripheral pliant pad supports the stator in a housing.

3. The taper bearing of claim 1, wherein:
the stator is configured to conform by elastic and resilient adaptation in response to biasing fluid forces selected from a group including radially increasing forces and radially decreasing forces.

4. The taper bearing of claim 1, wherein:
the shallow grooves are disposed on a surface selected alone or in combination from a group including the rotating external surface and the stationary internal surface.

5. The taper bearing of claim 1, wherein:
the shallow grooves have a pattern formation selected from a group including accommodation for unidirectional rotation and accommodation for bidirectional rotation of the tapering rotor.

6. The taper bearing of claim 1, wherein:
the stator is configured for elastic and resilient torsional toroidal deformation in response to deformation of the external surface.

7. The taper bearing of claim 1, wherein:
the stator is assembled out of a plurality of stacked elements selected from a group including at least one flat disk and at least one shell element.

8. The taper bearing of claim 1, wherein:
the stator is assembled out of a plurality of abutting sectors.

9. The taper bearing of claim 1, wherein:
the stator is assembled out of a plurality of arch-bound sectors.

10. The taper bearing of claim 1, wherein:
the tapering rotor is configured as a frustum of a cone.

11. The taper bearing of claim 1, wherein:
the stator is configured as an elastic and resilient body which is more elastic than the rotor.

12. A method permitting a fluid-film riding taper bearing disposable on a shaft to comply with biasing forces created therein, the method comprising:
providing a rotating monotonously tapering rotor having an axis of revolution and an external surface, providing a stationary toroidal stator having a longitudinal axis and an internal surface adapted for coaxial and conformal disposition relative to the rotating external surface,
disposing shallow grooves on a surface adjacent a fluid-filled interspace for creating the biasing fluid forces separating the external surface from the internal surface, implementing the stator as a non-rigid body, and
supporting the stator appropriately on at least one pliant support element allowing the stator to twist thereabout for responding to a distribution of biasing forces and for permitting elastic and resilient matching adaptation thereof to deformation of the rotor, where the taper bearing is configured for the shaft to protrude therethrough and away thereout.

13. The method of claim 12, wherein the stator is supported in a housing by using at least one concentric peripheral pad.

14. The method of claim 12, wherein the stator conforms by the elastic and resilient adaptation in response to the biasing forces selected as one of radially increasing forces and radially decreasing forces.

15. The method of claim 12, wherein the shallow grooves are disposed on a surface selected as at least one of the rotating external surface and the stationary internal surface.

16. The method of claim 12, wherein the shallow grooves have a directional pattern formation for accommodation of the tapering rotor in at least one of a unidirectional rotation and a bidirectional rotation.

17. The method of claim 12, wherein the stator is adapted for elastic and resilient deformation in toroidal torsion in response to deformation of the external surface.

18. The method of claim 12, wherein the stator is assembled out of a plurality of stacked elements selected as one of at least one flat disk and at least one shell element.

19. The method of claim 18, wherein the stator is assembled out of a plurality of abutting sectors.

20. The method of claim 18, wherein the stator is assembled out of a plurality of arch-bound sectors.

21. The method of claim 12, wherein the tapering rotor is shaped as a frustum of a cone.

22. The method of claim 12, wherein the stator has an elastic and resilient body which is more elastic than the rotor.

* * * * *